No. 708,557. Patented Sept. 9, 1902.
R. W. HUSSEY.
HARVESTER.
(Application filed Apr. 3, 1902.)
(No Model.)
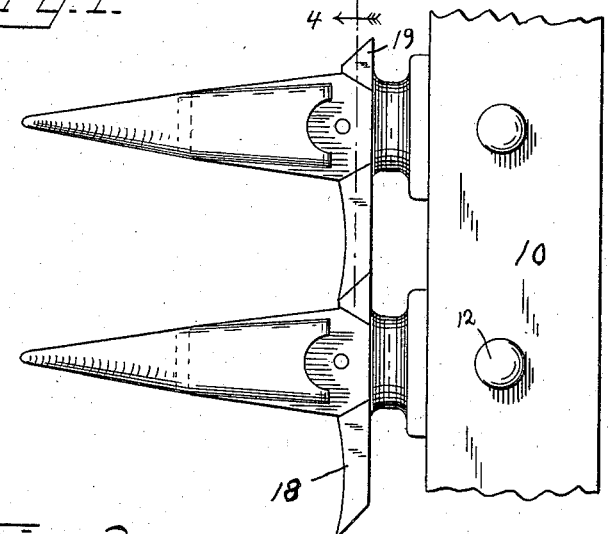
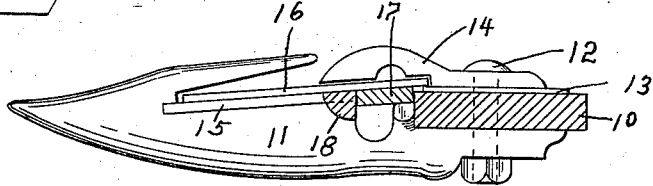
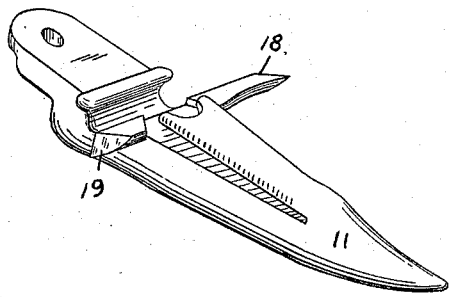
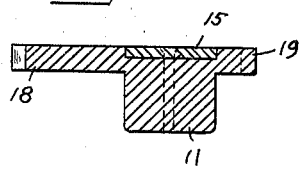
WITNESSES:
W. L. Bushong
F. E. Bryant
INVENTOR.
Ray W. Hussey
BY
V. H. Lockwood.
ATTORNEY.
THE NORRIS PETERS CO., PHOTO-LITHO., WASHINGTON, D. C.

United States Patent Office.

RAY W. HUSSEY, OF DUBLIN, INDIANA, ASSIGNOR TO THE HUSSEY MOWER AND IMPLEMENT COMPANY, OF DUBLIN, INDIANA, A CORPORATION OF INDIANA.

HARVESTER.

SPECIFICATION forming part of Letters Patent No. 708,557, dated September 9, 1902.

Original application filed January 6, 1902, Serial No. 88,948. Divided and this application filed April 3, 1902. Serial No. 101,293. (No model.)

*To all whom it may concern:*

Be it known that I, RAY W. HUSSEY, of Dublin, county of Wayne, and State of Indiana, have invented a certain new and useful Harvester; and I do hereby declare that the following is a full, clear, and exact description thereof, reference being had to the accompanying drawings, in which like numerals refer to like parts.

This invention relates to certain improvements in harvesters, being divided from my prior application on grass and grain cutting machines, filed January 6, 1902, Serial No. 88,948. This particular improvement relates to guard-fingers and their mounting on the finger-bar of harvesters.

The full nature of my invention will be understood from the accompanying drawings and the following description and claims.

In the drawings, Figure 1 is a plan of a portion of the finger-bar and fingers of the harvesting-machine, two guard-fingers being shown. Fig. 2 is a cross-section through the finger-bar with the knife and knife-bar thereon and showing the guard-finger in side elevation. Fig. 3 is a perspective of the guard-finger casting. Fig. 4 is a section on the line 4 4 of Fig. 1.

In detail the drawings mentioned show a finger-bar 10, with guard-fingers 11 secured thereto by bolts 12. The bolts pass through wearing-plates 13, superimposed on the finger-bar, and knife-clips 14, superimposed on the wearing-plate. A ledger-plate 15 is secured on the guard-finger, and on it the knife 16 reciprocates, said knife being secured to the knife-bar 17.

One novel feature consists in the guard-bars 18, which extend laterally from only one side of the finger. In a series of fingers when placed together this guard-bar extends from one finger to the adjacent finger, and its outer end is beveled outward away from the finger-bar to which it is connected, and when the guard-fingers are mounted on the finger-bar the beveled outer end of the guard-bar 18 bears against a reversely-inclined shoulder 19 on the adjacent finger. The guard-bar 18 and the shoulder 19 are located on opposite sides of the guard-bar and in line with each other, and since the shoulder is beveled rearwardly away from the finger and is very short it will not permit the guard-bar abutting against it to be pressed rearwardly by an obstruction so as to break the knife-bar or render it inoperative by reason of friction. It has been the practice to have two guard-bars secured to each finger, one on each side thereof and of equal length with rectangular ends. With such construction the guard-bars on the adjacent fingers would abut and form a joint about midway between the fingers, and since the joint is formed by two merely rectangular surfaces abutting the guard-bars would be easily forced rearward. The guard-bar 18 and shoulder 19 are integral preferably with the guard-finger and located immediately in front of the position of the knife-bar 17, so that the forward edge of the knife-bar bears against such guard-bars and shoulders. With the ledger-plates in place, also abutting against and being flush with said shoulders and guard-bars, there is continuous bearing of the forward edge of the knife-bar.

Another feature of the invention consists in sloping the finger-bar downward toward the rear slightly, so that it will be out of line with the knife and knife-bar. It has been customary for the finger-bar to be in line from front to rear with the knife. The object of this improvement is to cause the grass or grain to readily pass over and leave the finger-bar and not lodge thereon so as to choke the machine and prevent the knife from freely clearing itself.

What is claimed to be the invention, and to be secured by Letters Patent, is—

1. In a machine of the class described, a guard-finger with a guard-bar extending from only one side of the finger and beveled at its outer end forwardly and away from the finger, and a reversely-beveled surface on the opposite side of the finger against which the guard-bar of the adjacent finger will abut.

2. In a machine of the class described, a series of guard-fingers secured thereto, each finger being provided with a guard-bar that extends laterally to the adjacent finger and at its outer end is beveled forwardly and away from the finger to which the guard-bar is attached, and a reversely-beveled shoulder on the opposite finger against which the guard-bar of the adjacent finger abuts.

In witness whereof I have hereunto affixed my signature in the presence of the witnesses herein named.

RAY W. HUSSEY.

Witnesses:
 FRANK S. HUSSEY,
 E. B. HUSSEY.